(12) United States Patent
Ishikawa et al.

(10) Patent No.: US 7,169,078 B2
(45) Date of Patent: Jan. 30, 2007

(54) ENGINE IDLE SPEED CONTROL DEVICE

(75) Inventors: Tsuyoshi Ishikawa, Kawasaki (JP); Eri Imai, Chigasaki (JP); Masaki Koga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 177 days.

(21) Appl. No.: 11/066,257

(22) Filed: Feb. 28, 2005

(65) Prior Publication Data
US 2005/0188953 A1  Sep. 1, 2005

(30) Foreign Application Priority Data
Mar. 1, 2004  (JP)  ............. 2004-056136
Mar. 1, 2004  (JP)  ............. 2004-056137

(51) Int. Cl.
F16H 59/74 (2006.01)

(52) U.S. Cl. .................................... 477/102
(58) Field of Classification Search ............ 477/102; 701/54
See application file for complete search history.

(56) References Cited

U.S. PATENT DOCUMENTS 5,199,326 A  4/1993  Iwatsuki et al.

2002/0124554 A1  9/2002  Majima
2005/0187069 A1*  8/2005  Mori et al. ............ 477/102

FOREIGN PATENT DOCUMENTS

| EP | 1 231 397 A2 | 8/2002 |
| EP | 1 260 691 A2 | 11/2002 |
| EP | 1 348 895 A2 | 10/2003 |
| JP | 5-280398 A | 10/1993 |

* cited by examiner

Primary Examiner—Dirk Wright
(74) Attorney, Agent, or Firm—Global IP Counselors

(57) ABSTRACT

An engine idle speed control device set a target idle speed NsetN for a non-traveling range is set to a high value to activate the catalytic converter early, after the engine is started. Upon detecting that the automatic transmission has been shifted from a non-traveling range to a traveling range, the target idle speed is lowered to a first traveling idle speed Nset1. A feedback gain G used for feedback control of the ignition timing is then set to a larger gain value. The larger gain value is set such that it varies based on the temperature of the automatic transmission fluid or other parameter indicative of the engine friction and/or automatic transmission friction. As a result, the ignition timing is retarded in a precise manner, the engine speed is reduced, and the clutch engagement shock is reduced.

16 Claims, 9 Drawing Sheets

|   | B/B | H/C | F/C | FO/C | OR/C | LO/C | LR/B | R/C |
|---|---|---|---|---|---|---|---|---|
| N |   |   |   |   |   |   |   |   |
| D 1 |   |   | ○ | ○ | △ | ○ | △ |   |
| D 2 | ○ |   | ○ | ○ | △ |   |   |   |
| D 3 |   | ○ | ○ | ○ | △ |   |   |   |
| D 4 | ○ | ○ | ○ |   |   |   |   |   |
| R |   |   |   |   |   |   | ○ | ○ |

Fig. 3

ENGINE IDLE SPEED CONTROL DEVICE

CROSS-REFERENCE TO RELATED APPLICATIONS

This application claims priority to Japanese Patent Application Nos. 2004-056136 and 2004-056137. The entire disclosures of Japanese Patent Application Nos. Japanese Patent Application Nos. 2004-056136 and 2004-056137 are hereby incorporated herein by reference.

BACKGROUND OF THE INVENTION

1. Field of the Invention

The present invention generally relates to an engine idle speed control device for an internal combustion engine provided with an automatic translation. More specifically, the present invention relates to a device for controlling the idle speed appropriately when the automatic transmission from a non-traveling range to a traveling range.

2. Background Information

Japanese Laid-Open Patent Publication No. 05-280398 discloses a technology regarding an engine provided with an automatic transmission in which the actual engine speed is adjusted toward a target idle speed based on the difference between the actual engine speed and the target idle speed by feedback controlling the air quantity. The engine is configured such that when the automatic transmission is shifted from a non-traveling range (e.g., the N range) to a traveling range (e.g., the D range), the target idle speed is lowered in two stages.

In view of the above, it will be apparent to those skilled in the art from this disclosure that there exists a need for an improved engine idle speed control device. This invention addresses this need in the art as well as other needs, which will become apparent to those skilled in the art from this disclosure.

SUMMARY OF THE INVENTION

It has been discovered that in recent years, the idea of setting the target idle speed high when the transmission is in a non-traveling range has been entertained as a means of activating the catalytic converter earlier after a cold start. Since a physical shock (clutch engagement shock) will occur when the clutch is connected if the idle speed remains high when the automatic transmission is shifted from a non-traveling range to a traveling range, it is necessary to reduce the target idle speed from the target idle speed used in the non-traveling range to a lower target idle speed for use in the traveling range. In this case, as described in Japanese Laid-Open Patent Publication No. 05-280398, it is preferable to lower the target idle speed in two stages when the automatic transmission is shifted from a non-traveling range to a traveling range.

Thus, at the moment when the shift position (range) of the automatic transmission is changed, the target idle speed is changed from the target idle speed for the non-traveling range to a first traveling target idle speed for the traveling range that is lower than the target idle speed for the non-traveling range. Then, when a prescribed period has elapsed since the shift position of the automatic transmission was changed, the target idle speed is changed from the first traveling target idle speed for the traveling range to a second traveling target idle speed that is lower than the first traveling target idle speed.

The first traveling target idle speed is a rotational speed at which the clutch engagement shock would be at a tolerable level, but in order to avoid the clutch engagement shock it is necessary for the engine speed to fall to the first traveling target idle speed during the short amount of time between when the shift position is changed and when the clutch actually connects. With feedback control of the air quantity alone, the response speed is slow and it is difficult to ramp down to the first traveling target idle speed within the short amount of time. Consequently, this approach to controlling the idle speed does not completely solve the problem of clutch engagement shock because there are times when the rotational speed of the engine does not fall sufficiently before the clutch engages.

A feasible solution is to retard the ignition timing such that the engine speed ramps down to the first target idle speed in a short amount of time. However, since the rotational speed of the engine drops more quickly when the friction of the engine and the automatic transmission is large and more slowly when the friction is small, there is a need to control the idle speed in accordance with the friction of the engine and the automatic transmission.

The present invention was conceived in view of this issue. One object of the present invention is to provide an engine idle speed control device that can control the idle speed appropriately in accordance with the friction of the engine and/or the automatic transmission when the automatic transmission is shifted from a non-traveling range to a traveling range.

In order to achieve the above mentioned object and other objects of the present invention, an engine idle speed control device is provided that basically comprise a first traveling target idle speed setting section, a second idle speed setting section, a friction detecting section and an ignition timing retardation section. The first target idle speed setting section is configured to change a target idle speed from a non-traveling target idle speed to a first traveling target idle speed that is lower than the non-traveling target idle speed upon detecting an automatic transmission being shifted from a non-traveling range to a traveling range. The second idle speed setting section is configured to change the first traveling target idle speed to a second traveling target idle speed that is lower than the first traveling target idle speed upon detecting a prescribed period has elapsed since detecting that the automatic transmission was shifted. The friction detecting section is configured to detect a parameter indicative of at least one of engine friction and automatic transmission friction. The ignition timing retardation section is configured to selectively set a revision amount of an ignition timing to revise the ignition timing to a more retarded ignition timing based on the parameter upon the target idle speed being changed from the non-traveling target idle speed to the first traveling target idle speed, with the revision amount being set such that as the friction becomes less, the ignition timing is set to be more retarded.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 3 is a table that shows the operating states of the friction elements of the automatic transmission in accordance with the various embodiments of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
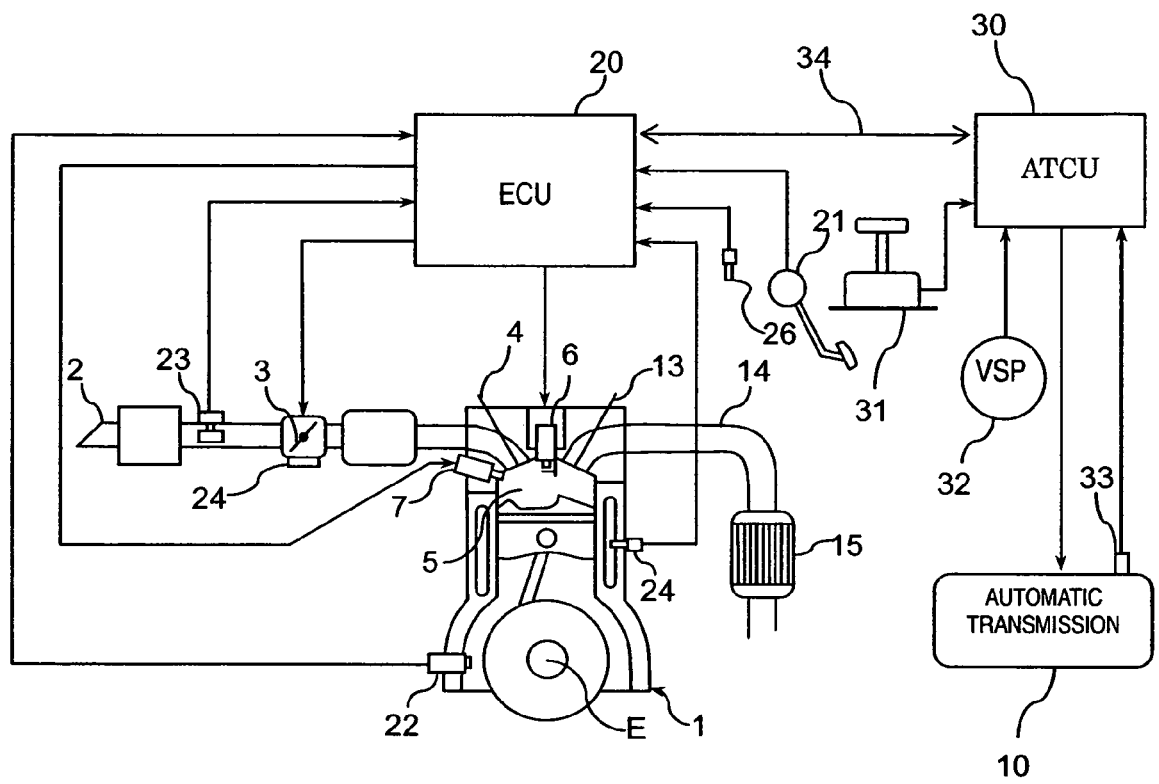
FIG. 1 is a simplified schematic illustration of an engine equipped with an engine idle speed control device or system in accordance with a first embodiment of the present invention.

Referring initially to FIG. 1, an internal combustion engine 1 with an output shaft E of the engine 1 connected to an automatic transmission 10 is diagrammatically illustrated in accordance with a first embodiment of the present invention. The engine 1 is equipped with various components that constitute an engine idle speed control device or system in accordance with a first embodiment of the present invention. The engine 1 has an air intake passage 2 with an electronically controlled throttle valve 3 mounted therein. The electronically controlled throttle valve 3 is configured and arranged for controlling the intake air quantity to the air intake passage 2 of the engine 1 by way of one or more intake valves 4 (only one shown). The air intake passage 2 is fluidly connected to a plurality of combustion chambers 5 (only one shown) of the engine 1. Each combustion chamber 5 includes a spark plug 6 and a fuel injection valve 7. The spark plug 6 and the fuel injection valve 7 are mounted to the combustion chamber 5 in a conventional manner.

In this embodiment, the engine 1 is controlled by an engine control unit (ECU) 20 that is configured and arranged to serve as an engine controller. The engine control unit forms a part of the engine idle speed control device that is configured and arranged to reduce the clutch engagement shock that occurs when an automatic transmission is shifted from a non-traveling range to a traveling range after starting the engine 1 of a vehicle by controlling the idle speed of the engine 1 in an exact manner.

The opening degree of the electronically controlled throttle valve 3 is controlled by a stepper motor or the like that is operated with a signal from the engine control unit 20. The fuel injection valve 7 has a solenoid and is configured to open when the solenoid is energized by an injection pulse signal that is issued from the engine control unit 20 in synchronization with the engine rotation. When the fuel injection valve 7 opens, it injects fuel that has been pressurized to a prescribed pressure.

Inside the combustion chamber 5, the fuel forms an air-fuel mixture and is combusted by a spark from the spark plug 6. The spark plug 6 ignites a spark based on an ignition signal issued from the engine control unit 20. Although in this embodiment the fuel is injected directly into the combustion chamber 4, it is also acceptable for the fuel to be injected into the air induction system.

The fuel injected in the combustion chamber 5 forms an air-fuel mixture, that is ignited and combusted by a spark from the spark plug 6. The engine 1 also has one or more exhaust valves 13 arranged in each of the combustion chambers 5 with the exhaust ports being fluidly connected to an exhaust passage 14. The exhaust passage 14 includes a catalytic converter 15 with a catalyst for exhaust purification in a conventional manner. Thus, the air-fuel mixture after being combusted results in exhaust being expelled to the exhaust passage 14 by way of the exhaust valve(s) 13. The exhaust is then fed to the catalytic converter 15 for cleaning the exhaust.

The engine 1 is controlled by an engine control unit or engine control unit 20 to perform the controlled combustion of the fuel air mixture as discussed below. Basically, with the present invention, the engine speed is reduced by the engine control unit 20 retarding the ignition timing and, as a result, the engine speed can be dropped to the first target idle speed earlier and with good response. Although the rotational speed of the engine falls more quickly when the friction of the engine and automatic transmission is large and more slowly when the friction is small, the engine speed can be reliably ramped down to the first target idle speed within the prescribed period because the revision quantity serving to revise the ignition timing to a more retarded ignition timing is set in accordance with the parameter representing the friction such that the smaller the friction is, the more the ignition timing is retarded. As a result, clutch engagement shock can be reliably prevented and, thus, the target idle speed used in the non-traveling range can be set high in order to promote early activation of the catalytic converter 15.

The engine control unit 20 is a microcomputer comprising of a central processing unit (CPU) and other peripheral devices. The engine control unit 20 can also include other conventional components such as an input interface circuit, an output interface circuit, and storage devices such as a ROM (Read Only Memory) device and a RAM (Random Access Memory) device. The engine control unit 20 preferably includes an engine control program that controls various components as discussed below. The engine control unit 20 receives input signals from various sensors (described below) that serve to detect the operating state of the engine 1 and executes the engine controls based on these signals. It will be apparent to those skilled in the art from this disclosure that the precise structure and algorithms for the engine control unit 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The engine control unit 20 receives the following as input signals: the accelerator position APO detected by an accelerator pedal sensor 21, the engine rotational speed Ne detected by a crank angle sensor 22, the intake air quantity Qa detected by a hot wire air flow meter 23, the throttle valve opening TVO detected by a throttle sensor 24, an engine coolant temperature Tw detected by a coolant temperature sensor 25 and the engine oil temperature Teng-Oil detected by an oil temperature sensor 26 and like.

Examples of signals input to the engine control unit 20 include the accelerator position APO detected by an accelerator pedal sensor 21, the engine rotational speed Ne detected by a crank angle sensor 22, the intake air quantity Qa detected by an air flow meter 23, and the engine coolant temperature Tw detected by a coolant temperature sensor 24. Signals are also input from the engine key switch 26 having an ignition switch and a start switch.

The engine control unit 20 controls the opening degree of the electronically control throttle valve 3, the fuel injection timing and fuel injection quantity of the fuel injection valve 5, and the ignition timing of the spark plug 6 based on the engine operating conditions indicated by the input signals.

More specifically, when the engine 1 is idling, the engine control unit 20 detects the actual engine rotational speed Ne and, based on the difference between the actual engine rotational speed Ne and a target idle speed, controls the opening degree of the throttle valve 3 and feedback controls the air quantity such that the actual engine rotational speed Ne approaches the target idle speed. Additionally, in consideration of the response delay of the air quantity control, the ignition timing is feedback controlled based on the difference between the actual engine rotational speed Ne and the target idle speed such that the actual engine rotational speed Ne approaches the target idle speed.

Figure 2:
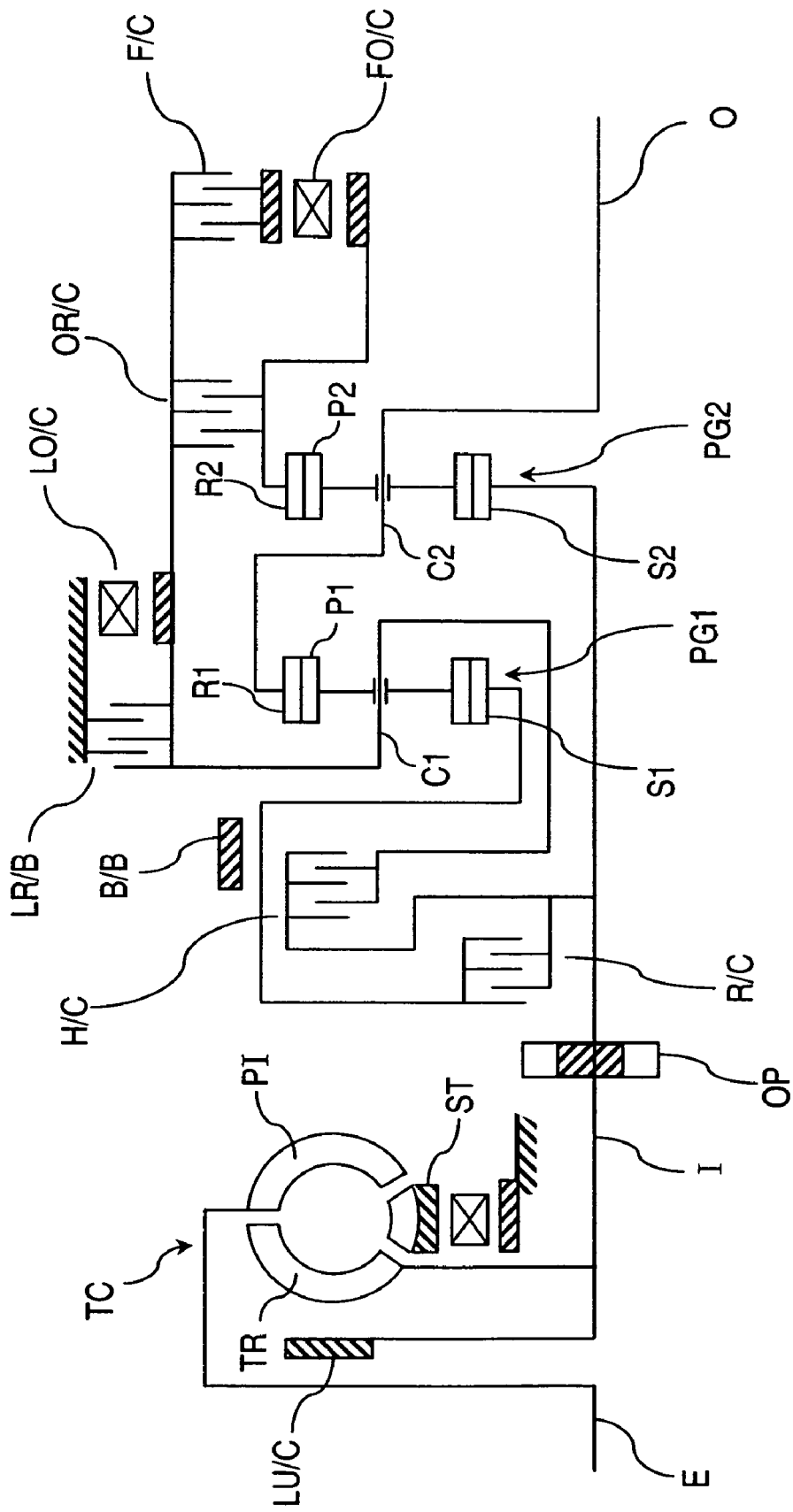
FIG. 2 is a simplified schematic diagram of an automatic transmission used with engines in accordance with the various embodiments of the present invention.

The output shaft E of the engine 1 is operatively connected to an automatic transmission 10 as illustrated in FIG. 2, which is a simplified schematic diagram of the automatic transmission 10. The automatic transmission 10 basically includes an input shaft I, a torque converter TC, a first planetary gear set PC1, a second planetary gear set PC2, an output shaft O, and various friction elements. The torque converter TC is configured and arranged to transmit rotation from the engine output shaft E to the input shaft I, which in turn is operatively connected to the output shaft O through the first planetary gear set PC1, the second planetary gear set PC2 and various friction elements.

The torque converter 3 comprises a pump impeller PI, a turbine runner TR, and a stator ST. The pump impeller PI is configured and arranged to be driven by the engine output shaft E. The turbine runner TR is arranged and configured to be fluid-driven by the pump impeller PI through an internal working fluid and transmit power to the input shaft I. The stator ST is mounted on a stationary shaft with a one-way clutch disposed there-between. The stator ST is configured to increase the torque imparted to the turbine runner TR. The torque converter 3 is also equipped with a lockup clutch LU/C that can establish a direction connection between the engine output shaft E and the input shaft I.

The first planetary gear set PG1 comprises a sun gear S1, a ring gear R1, a pinion P1 and a carrier C1. The pinion P1 that meshes with the sun gear S1 and the ring gear R1, while the carrier C1 supports the pinion P1 in a freely rotatable manner. The second planetary gear set PG2 comprises a sun gear S2, a ring gear R2, a pinion P2, and a carrier C2. The pinion P2 that meshes with the sun gear S2 and the ring gear R2, while the carrier C2 supports the pinion P2 in a freely rotatable manner.

The friction elements will now be described. The carrier C1 is configured and arranged such that it can be selectively connected to the input shaft I through a high clutch H/C when appropriate. The sun gear S1 is configured and arranged such that it can be selectively held stationary when appropriate by a band brake B/B and connected to the input shaft I when appropriate by a reverse clutch R/C. The carrier C1 can also be selectively held stationary when appropriate by a low reverse brake LR/B and prevented from rotating backwards (opposite direction as engine output shaft) by a low one-way clutch LO/C. The ring gear R1 is integrally connected to the carrier C2 such that it drives the output shaft O, while the sun gear S2 is connected to the input shaft I. The ring gear R2 can be selectively connected to the carrier C1 when appropriate by an overrun clutch OR/C and its relationship to the carrier C1 can also be modified by a forward one-way clutch FO/C and a forward clutch F/C. The high clutch H/C, the reverse clutch R/C, the low reverse brake LR/B, the overrun clutch OR/C, the forward clutch F/C, and the band brake B/B are each hydraulically operated such that they can be connected or held stationary as appropriate.

Also, an oil pump OP is provided on the input shaft I of the transmission and is configured and arranged to pump out oil when the input shaft I rotates. Since the oil discharged from oil pump OP controls the clutches, when the rotational speed of the input shaft I increases, the output of the oil pump OP increases and the shift lag shortens.

Figure 3:
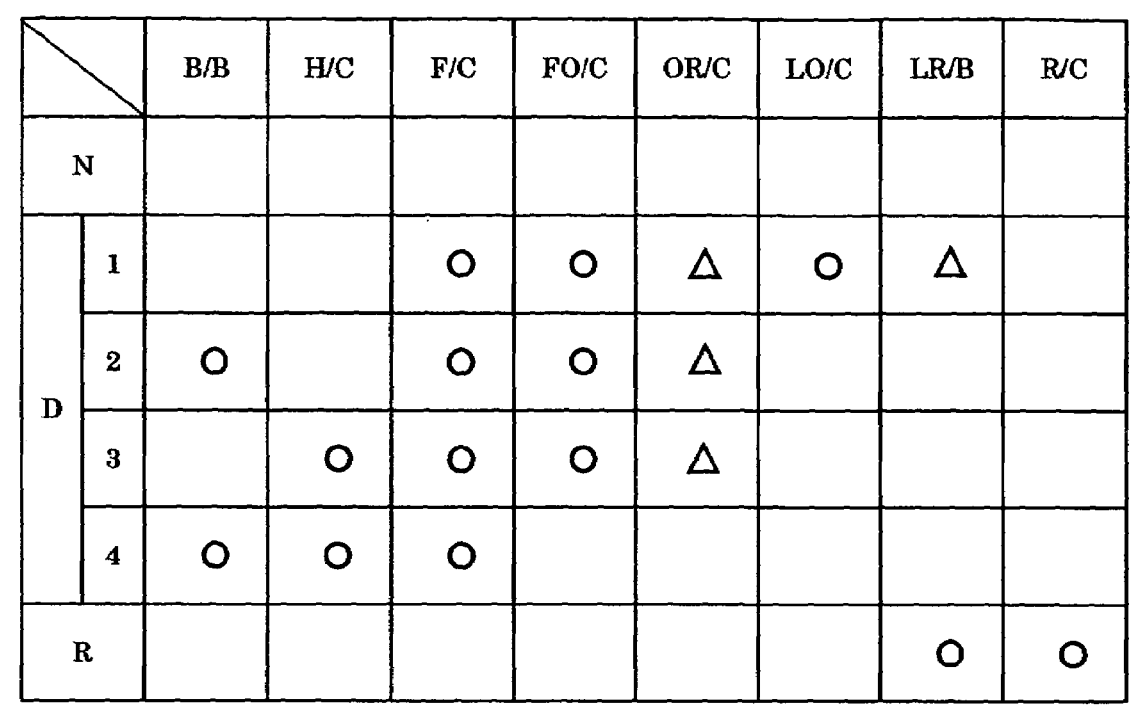

The automatic transmission shown in FIG. 2 is thus configured such that by operating different combinations of the friction elements B/B, H/C, F/C, OR/C, LR/B, R/C as shown in FIG. 3 together with appropriate operation of the friction elements FO/C and LO/C, the rotational states of the component elements of the planetary gear sets PG1, PG2 can be changed. As a result, the rotational speed of the output shaft O with respect to the rotational speed of the input shaft I can be changed so as to obtain four forward speeds and one reverse speed, as shown in FIG. 3. In FIG. 3, circles (o) indicate operation of (influx of working fluid to) the element and triangles (Δ) indicate friction elements that should be operated when engine braking is necessary.

Returning to FIG. 1, the friction elements of the automatic transmission 10 are controlled by an automatic transmission control unit (ATCU) 30. The automatic transmission control unit 30 receives input signals from a shift position sensor (inhibitor switch) 31, a vehicle speed sensor 32 and an AT oil temperature sensor 33. The shift position sensor 31 is configured and arranged to detect the shift position (e.g., neutral N, drive D, reverse R) of a shift selector and output a signal indicative of the shift position to the automatic transmission control unit 30. The vehicle speed sensor 32 is configured and arranged to detect the vehicle speed VSP and output a signal indicative of the vehicle speed to the automatic transmission control unit 30. The AT oil temperature sensor 33 is configured and arranged to detect the oil temperature (AT oil temperature) Tat-oil and like of the transmission 10 and output a signal indicative of the oil temperature to the automatic transmission control unit 30. The engine control unit 20 and the automatic transmission control unit 30 are connected together by a communication line 34 so that they can exchange information.

The automatic transmission control unit 30 sets the gear ratio (first, second, third, or fourth speed) of the automatic transmission 10 based on the shift position detected by the shift position sensor 31 and, in the case of the D range, based on the accelerator position APO and the vehicle speed VSP. The automatic transmission control unit 30 then controls the friction elements of the automatic transmission 10 as appropriate.

Meanwhile, the engine control unit 20 takes the shift position information and/or and the AT oil temperature Tat-oil obtained from the automatic transmission control unit 30 into account when it controls the idle speed (i.e., sets the target idle speed, etc.).

Figure 4:
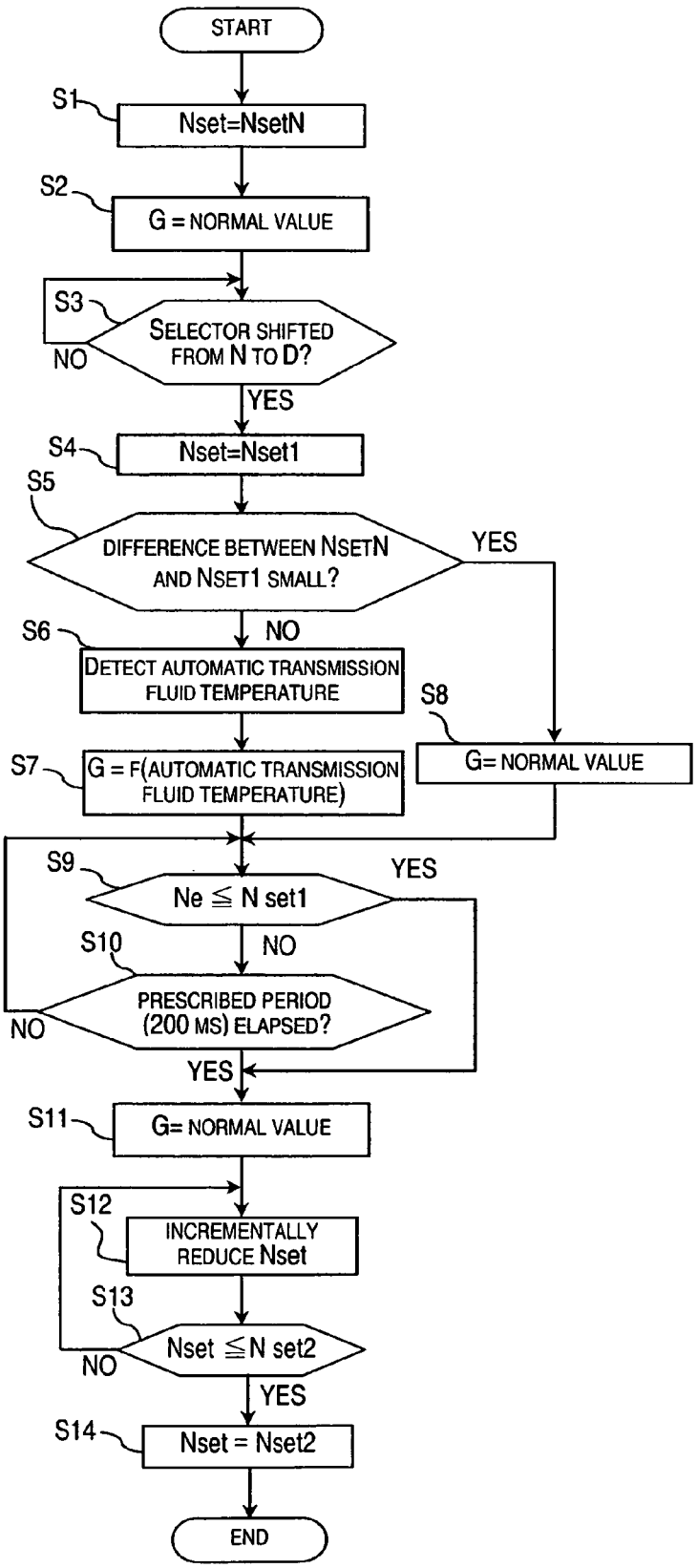
FIG. 4 is a flowchart of a target idle speed setting routine in accordance with the first embodiment of the present invention.

FIG. 4 is a flowchart for a target idle speed setting routine executed by the engine control unit 20 after the engine is started. The routine also serves to select the method of setting the ignition timing.

In step S1, as an initial setting, the engine control unit 20 sets the target idle speed Nset to a target idle speed NsetN for the N range. The target idle speed NsetN for the N range is set to a high speed in order to accomplish early activation of the catalytic converter after a cold start. The target idle speed NsetN can also be varied (e.g., between 1500 and 1800 rpm) depending on the coolant temperature Tw when the engine 1 is started and the amount of time that has elapsed since the engine 1 was started.

In step S2, the engine control unit 20 sets the feedback gain G used for ignition timing feedback control to a normal value (smaller value used for stable ramping down of the idle speed) so as to execute normal control of the ignition timing. The target idle speed NsetN is also varied in accordance with the coolant temperatureTw when the engine 1 is started and the amount of time that has elapsed since the engine was started.

Then, in step S3, the engine control unit 20 determines if the shift position has been changed from a non-traveling range (e.g., the N range) to a traveling range (e.g., the D range), i.e., if the shift selector has been moved from, for example, N to D, based on the signal from the shift position sensor 31. If so, the engine control unit 20 proceeds to step S4.

In step S4, since the shift selector has been moved from N to D, the engine control unit 20 changes the target idle speed Nset to a first traveling target idle speed Nset1 for the D range. The first traveling target idle speed Nset1 for the D range is set to a lower value than the target idle speed NsetN for the N range, i.e., to a value (e.g., 800 rpm to 1000 rpm) at which an abrupt torque change will not occur due to the decline in rotational speed with respect to the target idle speed NsetN for the N range and clutch engagement shock will not occur (set to a rotational speed at which the abrupt torque change can be accepted).

In step S5, the engine control unit 20 determines if the difference between the target idle speed NsetN for the N range and the first traveling target idle speed Nset1 for the D range is small (i.e., if |NsetN−Nset1|<prescribed value), which can occur when the engine is restarted while hot. If the difference is large, the engine control unit 20 proceeds to steps S6 and S7.

In step S6, the engine control unit 20 is configured to detect such items as the temperature Tat-oil of the transmission fluid of the automatic transmission, the temperature Tw of the engine coolant, and the temperature Teng-oil of the engine oil as parameters representing the friction of the engine and/or the automatic transmission.

In step S7, the feedback gain G used for feedback control of the ignition timing is set to a value larger than the normal value in order to greatly retard the ignition timing. The feedback gain G is set such that it varies based on the detected friction.

Figure 6:
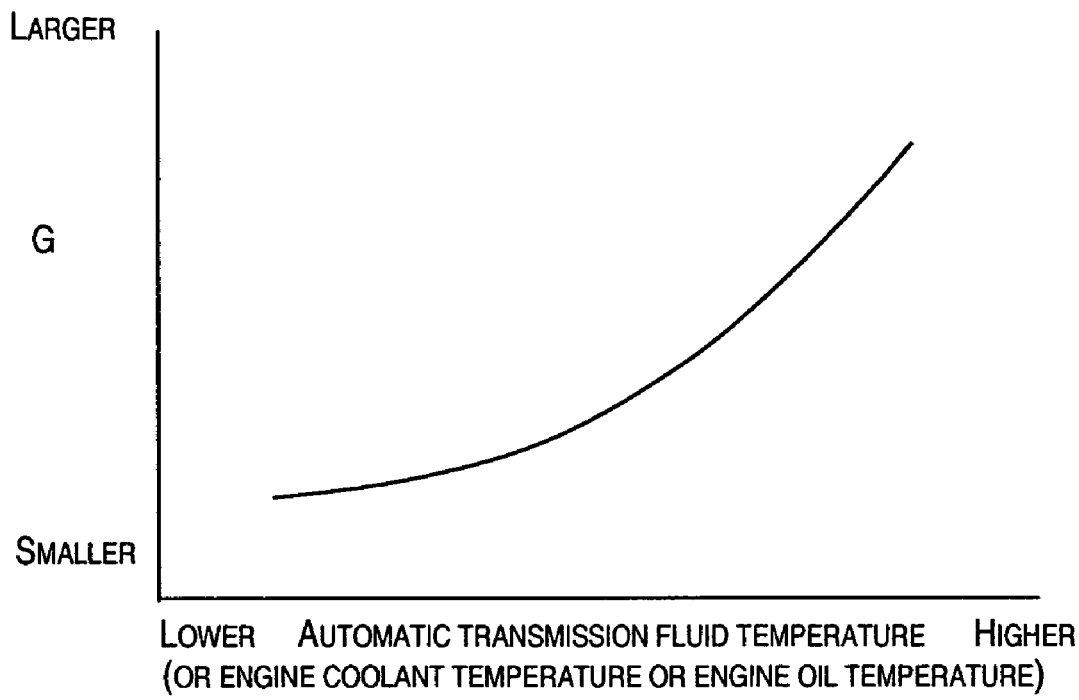
FIG. 6 is a table for setting the ignition timing retardation amount in accordance with the first embodiment of the present invention.
Figure 6:
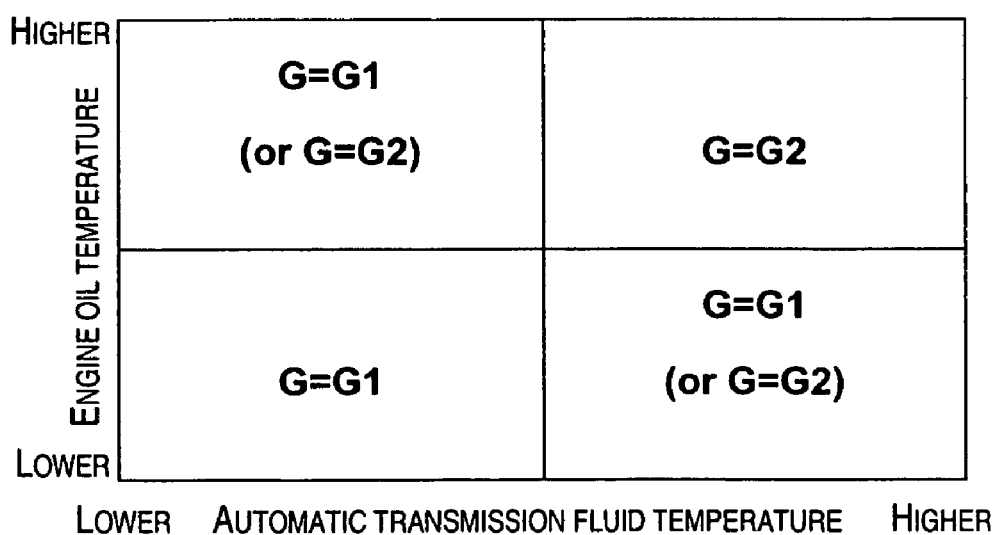

More specifically, the engine control unit 20 refers to a table or map like that shown in FIG. 6(A) and sets the feedback gain G as a function of the temperature Tat-oil of the transmission fluid of the automatic transmission such that the higher the temperature Tat-oil, the larger the feedback gain G. It is also acceptable to set the feedback gain G based on the temperature Tw of the engine coolant or the temperature Teng-oil of the engine oil. Furthermore, the feedback gain G can be set such that it varies continuously or in stages.

It is also acceptable to refer to a table like that shown in FIG. 6(B) and set the feedback gain G to a larger-than-normal value G2 (G2>G1) when both the transmission fluid temperature Tat-oil and the engine oil temperature Teng-oil are equal to or above prescribed values. It is also acceptable to set the feedback gain G to a larger-than-normal value G2 (G2>G1) when either the transmission fluid temperature Tat-oil is equal to or above a prescribed value or the engine oil temperature Teng-oil is equal to or above a prescribed value.

Meanwhile, if it is determined in step S5 that the difference between the target idle speed NsetN for the N range and the first traveling target idle speed Nset1 for the D range is small, then the engine control unit 20 proceeds to step S8 because conditions are such that stable ramp-down feedback control of the idle speed can be executed. In step S8, the engine control unit 20 sets the feedback gain G for feedback control of the idle speed to the normal value.

The engine control unit 20 then proceeds to steps S9 and S10.

In step S9, the engine control unit 20 determines if the engine speed Ne is less than the first traveling target idle speed Nset1. If so, the engine control unit 20 proceeds to step S10.

In step S10, the engine control unit 20 determines if a prescribed period has elapsed since the shift selector was moved from N to D (more specifically, the period is set as an amount of time, e.g., 200 ms). The prescribed period (prescribed amount of time) is the amount of extra time (delay time) between when the shift selector is moved from N to D and when the clutch actually begins to engage. After this period elapses, it takes another approximately 800 ms for the clutch to engage.

If the prescribed period has not yet elapsed, the engine control unit 20 returns to step S9.

If it is determined that the prescribed period has elapsed in step S10 or if the prescribed period has not yet elapsed but it is determined in step S9 that the engine speed Ne has fallen below the first traveling target idle speed Nset1, then the engine control unit 20 proceeds to step S11.

In step S11, the engine control unit 20 returns the feedback gain G used for feedback control of the ignition timing to the normal value so as to return to normal control of the ignition timing.

In step S12 In step S12, the engine control unit 20 incrementally decreases the target idle speed of the Nset. In other words, the engine control unit 20 subtracts a prescribed value from the current target idle speed Nset so that the target idle speed Nset is revised to a lower value.

In step S13, the engine control unit 20 determines if the target idle speed Nset has reached the second target idle speed Nset 2 for the D range (Nset≦Nset2). If not, the engine control unit 20 returns to step S12 where it incrementally decreases the target idle speed Nset. If so, the engine control unit 20 proceeds to step S14 where it fixes the target idle speed Nset at the second target idle speed Nset 2 for the D range and ends the control routine. The second target idle speed Nset2 for the D range (e.g., 650 to 700 rpm) is lower than the first target idle speed Nset1 and is set in consideration of the fuel efficiency and idle stability.

Figure 5:
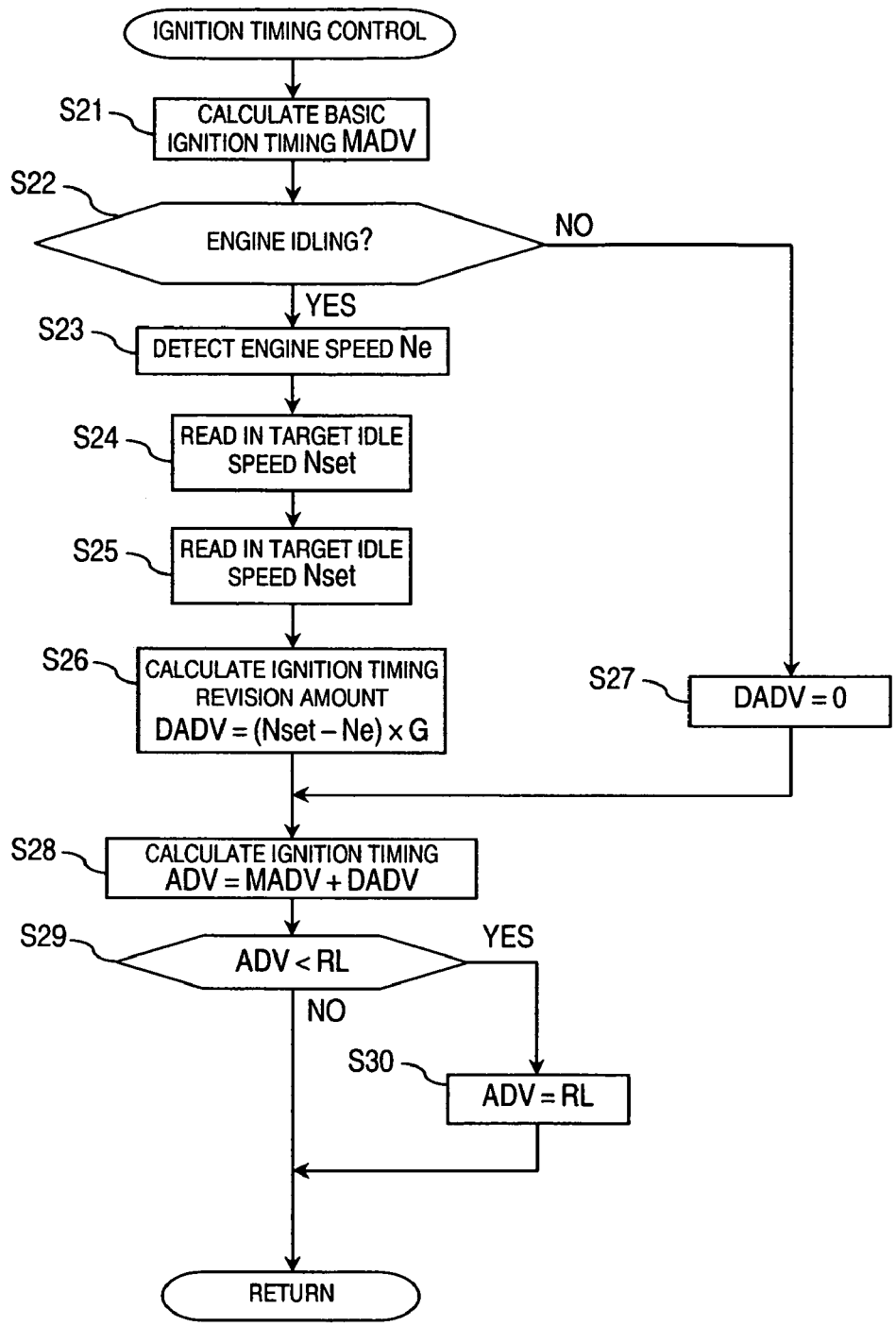
FIG. 5 is a flowchart of an ignition timing control routine in accordance with the first embodiment of the present invention.

FIG. 5 is a flowchart for an ignition timing control routine that is executed repeatedly per unit time by the engine control unit 20.

In step S21, the engine control unit 20 sets a basic ignition timing (crank angle before top dead center) MADV based on the engine rotational speed NE and the load (e.g., air quantity Qa).

In step S22, the engine control unit 20 determines if the engine operating conditions satisfy the conditions for executing idle speed control through ignition timing control. If so, the engine control unit 20 proceeds to step S23.

In step S23, the engine control unit 20 detects the actual engine rotational speed Ne.

In step S24, the engine control unit 20 reads the target idle speed Nset set by the routine shown in FIG. 4.

In step S25, the engine control unit 20 reads the feedback gain G set by the routine shown in FIG. 4.

In step S26, the engine control unit 20 uses the equation below to calculate an ignition timing revision amount DADV by multiplying the difference between the actual idle speed Ne and the target idle speed Nset (i.e., Nset−Ne) by a preset feedback gain G for stable ramping down of the idle speed.

$$DADV=(Nset-Ne) \times G$$

When the actual engine rotational speed Ne is higher than the target idle speed Nset, the revision amount DADV has a negative value and thus serves to revise the ignition timing to a more retarded timing. Conversely, when the actual engine rotational speed Ne is lower than the target idle speed Nset, the revision amount DADV has a positive value thus serves to revise the ignition timing to a more advanced timing.

Meanwhile, if it is determined in step S22 that the engine operating conditions do not satisfy the conditions for executing idle speed control through ignition timing control, the engine control unit 20 proceeds to step S27 where it sets both the ignition timing revision amount DADV to 0.

After step S26 and S27, the engine control unit 20 proceeds to step S28.

In step S28, the engine control unit 20 uses the equation below to calculate the ignition timing ADV by adding the ignition timing revision amount DADV to the basic ignition timing MADV.

$$ADV=MADV+DADV$$

In step S29, the engine control unit 20 compares the ignition timing ADV calculated in step S28 to the retardation limit ignition timing RL. If ADV is less than RL, then, in step S30, the engine control unit 20 limits the ignition timing ADV to the retardation limit ignition timing RL, taking the engine stop into account.

The control executed after the engine is started will now be explained using the time charts shown in FIG. 7.

The control of engine rotational speed Ne that is executed after the engine is started will now be explained using the time charts shown in FIG. 7.

After the engine is started, the target idle speed Nset is set to the target idle speed NsetN for the N range. The target idle speed NsetN is set in accordance with the coolant temperature at the time when the engine is started and the amount of time that has elapsed since the engine was started. Since it is set to a comparatively high value (1500 to 1800 rpm), it facilitates early activation of the catalytic converter after cold starting.

When it is detected that the shift selector has been moved from N to D after the engine is started, the target idle speed Nset is set to a first target idle speed Nset1 (e.g., 1000 to 1200 rpm) for a prescribed amount of time (e.g., 200 ms) corresponding to the amount of time required for the clutch to actually start engaging. The first target idle speed Nset1 is set to be considerably lower the target idle speed NsetN for the N range but higher than the final second idle speed Nset2 for the D range. Furthermore, the first target idle speed Nset1 is set to a value at which an abrupt torque change will not occur due to the decline in rotational speed with respect to the target idle speed NsetN for the N range and clutch engagement shock will not occur. Furthermore, the feedback gain G is set on the larger value than the normal value.

The deviation between the actual engine speed Ne and the target idle speed Nset becomes large at the moment when the shift selector is moved from N to D. Since the value of the ignition timing revision amount DADV (=[Nset−Ne]×G) becomes a negative value, the ignition timing ADV is revised to a more retarded timing. As a result, the engine speed Ne is reduced with good response and the first target idle speed Nset1 can be reached reliably within the prescribed amount of time (200 ms).

Figure 7:
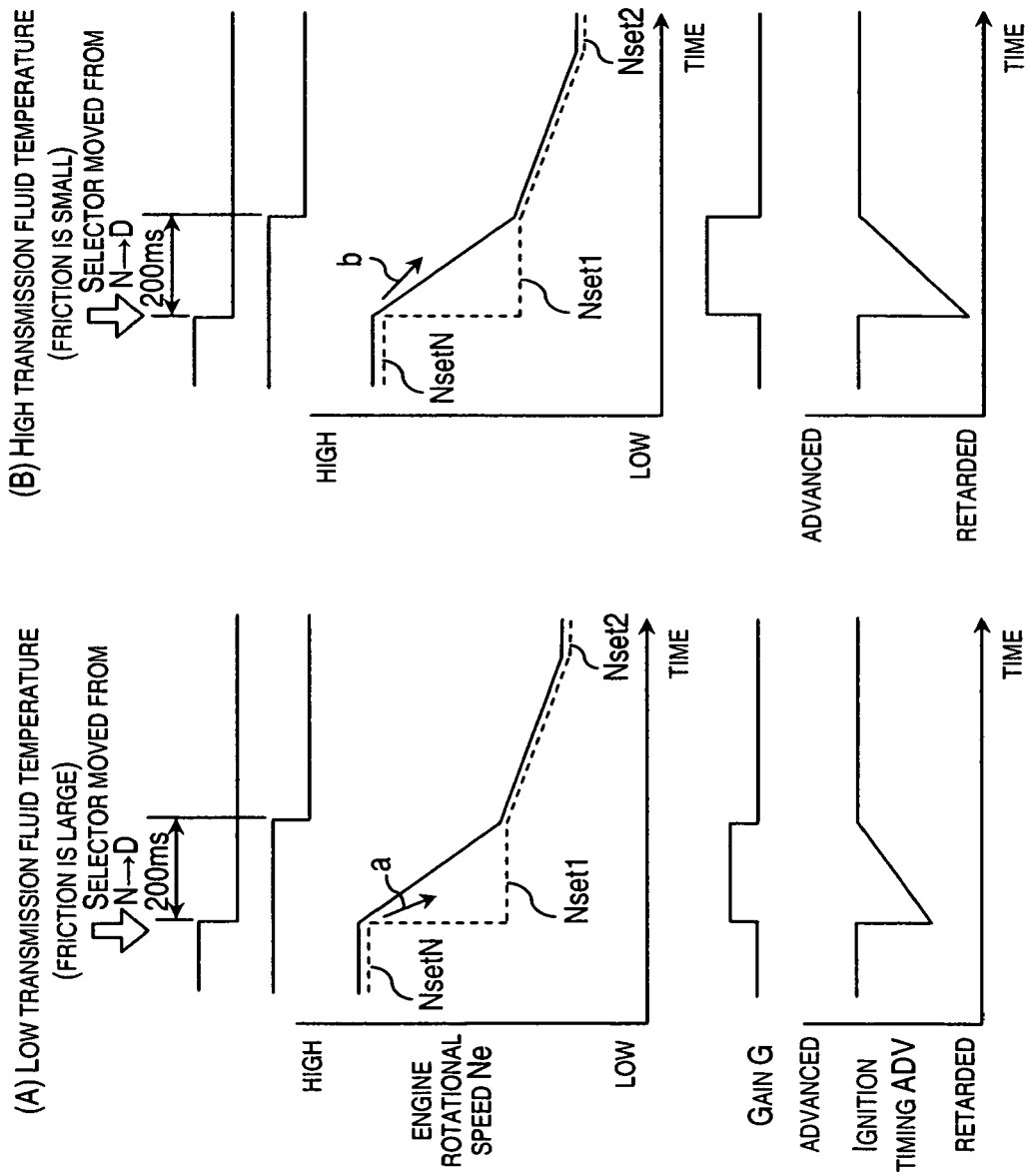
FIG. 7 are time charts showing the control of the engine rotational speed executed after the engine is started relative to various settings in accordance with the first embodiment of the present invention.

The time charts (A) of FIG. 7 illustrates a case in which the temperature Tat-oil of the automatic transmission fluid (or engine oil temperature or engine coolant temperature) is low and the friction is large. Since the friction is large, the engine rotational speed could easily fall rapidly as indicated by the arrow a. However, since the larger-than-normal value of the feedback gain G is set to a comparatively small value, a rapid drop in engine speed can be prevented while still reliably reducing the engine speed to the first traveling target idle speed Nset1 within the prescribed period (200 ms).

The time charts (B) of FIG. 7 illustrates a case in which the temperature Tat-oil of the automatic transmission fluid (or engine oil temperature or engine coolant temperature) is high and the friction is small. Since the friction is small, there is the possibility that the engine rotational speed will fall too slowly, as indicated by the arrow b. However, since the larger-than-normal value of the feedback gain G is set to a comparatively large value, the engine speed is encouraged to fall and the engine speed can be reduced to the first traveling target idle speed Nset1 within the prescribed period (200 ms).

Afterwards, when the prescribed amount of time (200 ms) has elapsed or when the engine speed Ne has fallen to first idle speed Nset1, the target idle speed Nset is incrementally reduced to a final second target idle speed Nset2 (e.g., 650 to 700 rpm).

The timing at which the clutch actually engages is indefinite but it occurs within approximately 800 ms after the prescribed time (200 ms) after shifting from N to D elapses. Since the engine speed Ne is equal to or less than the first target idle speed Nset1 by that the time the clutch engages, clutch engagement shock does not occur.

With this embodiment, when the target idle speed is changed from the target idle speed NsetN for the N range to the first traveling target idle speed Nset1 for the D range, the engine speed is dropped by retarding the ignition speed. As a result, the engine speed can be reduced to the first traveling target idle speed Nset1 earlier and with good response.

Although the rotational speed of the engine 1 falls more quickly when the friction of the engine 1 and the automatic transmission 10 is large and more slowly when the friction is small, the engine speed can be reliably ramped down to the first target idle speed within the prescribed period because the revision quantity serving to revise the ignition timing to a more retarded ignition timing is set in accordance with the parameter(s) representing the friction (G→DADV) such that the smaller the friction is, the more the ignition timing is retarded.

Consequently, clutch engagement shock can be reliably prevented and, as a result, the target idle speed NsetN used in the non-traveling range N can be set high in order to promote early activation of the catalytic converter 15.

With this embodiment, when the target idle speed has been set to the first traveling target idle speed Nset1, the feedback gain G used during feedback control of the ignition timing is set to a larger value than at other times in order to greatly retard the ignition timing. Furthermore, the size of the feedback gain G is set such that it varies in accordance with the parameter(s). As a result, the idle speed control can be accomplished in a simple manner using feedback control of the ignition timing.

The idle speed control through feedback control of the ignition timing is normally executed with the objective of stably ramping down to the target idle speed and is not well suited to aggressive dropping of the engine speed because the normal value of the feedback gain is small. The engine speed can be reduced more rapidly by changing the feedback gain to a larger value, but the feedback gain is returned to the normal value during normal idle speed control in order to prevent such repercussions as rough idling.

With this embodiment, since the temperature of the engine coolant, the temperature of the engine oil, or the temperature of the automatic transmission fluid is detected and used as the parameter representing the friction of the engine and/or the automatic transmission, the control can be accomplished using normally provided sensors.

With this embodiment, since a limiter is provided to set a retarded ignition timing (RL) beyond which the ignition timing cannot be retarded further, excessive retardation of the ignition timing is avoided and stalling of the engine caused by sudden a decline in rotational speed can be prevented. If the D range is selected when the engine speed is high due to revving of the engine or the like, the difference between the actual engine speed and the target idle speed will be large and there is the possibility that the ignition timing will be retarded by too great an amount, causing the engine to stall. The limiter prevents such stalling of the engine by preventing excessive retardation of the ignition timing.

Although this embodiment is configured to retard the ignition timing by a large amount by changing the feedback gain G used for feedback control of the ignition timing to a large value when it is necessary to cause the engine rotational speed to fall rapidly, it is also acceptable to set a retardation revision amount in addition to the ignition timing revision amount DADV used for feedback control of the ignition timing and to vary the setting value of the retardation revision amount in accordance with a parameter representing the friction of the engine and/or automatic transmission.

Second Embodiment

Figure 8:
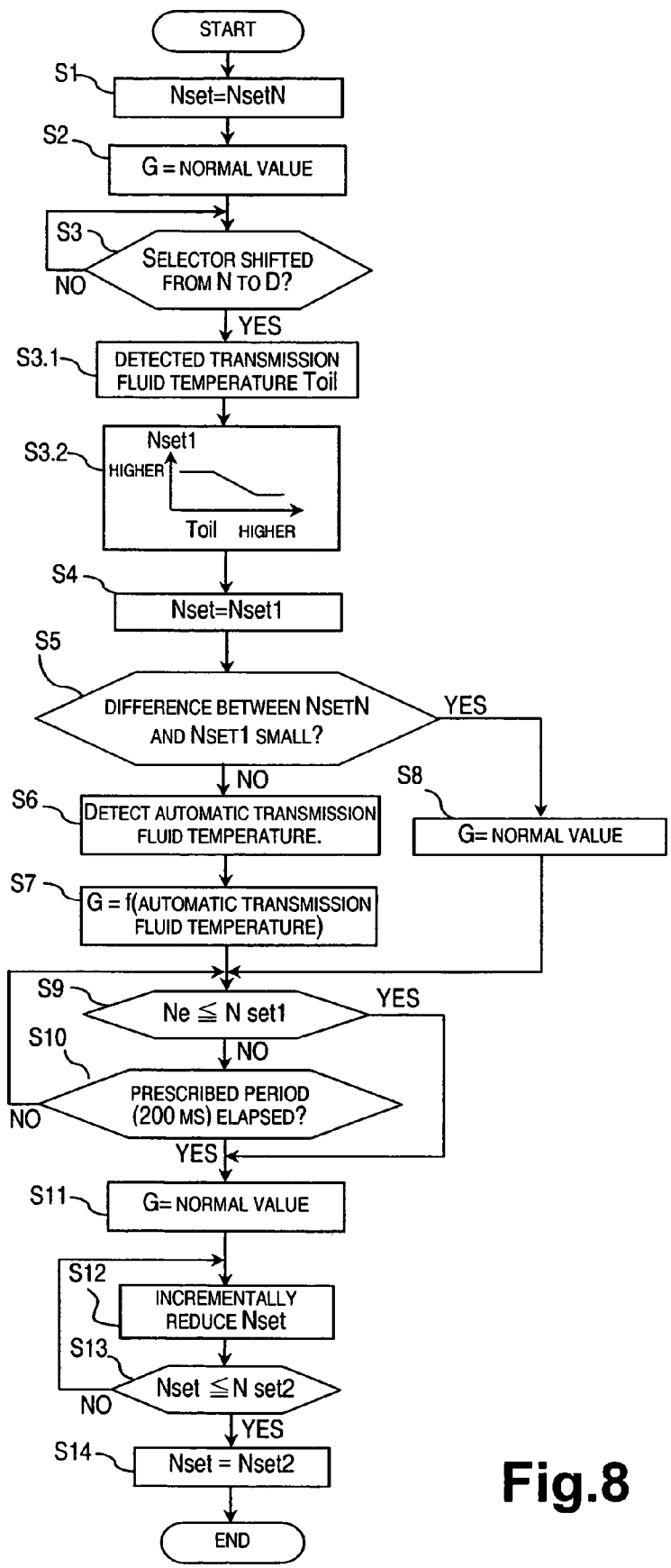
FIG. 8 is a flowchart of a target idle speed setting routine in accordance with a second embodiment of the present invention.
Figure 9:
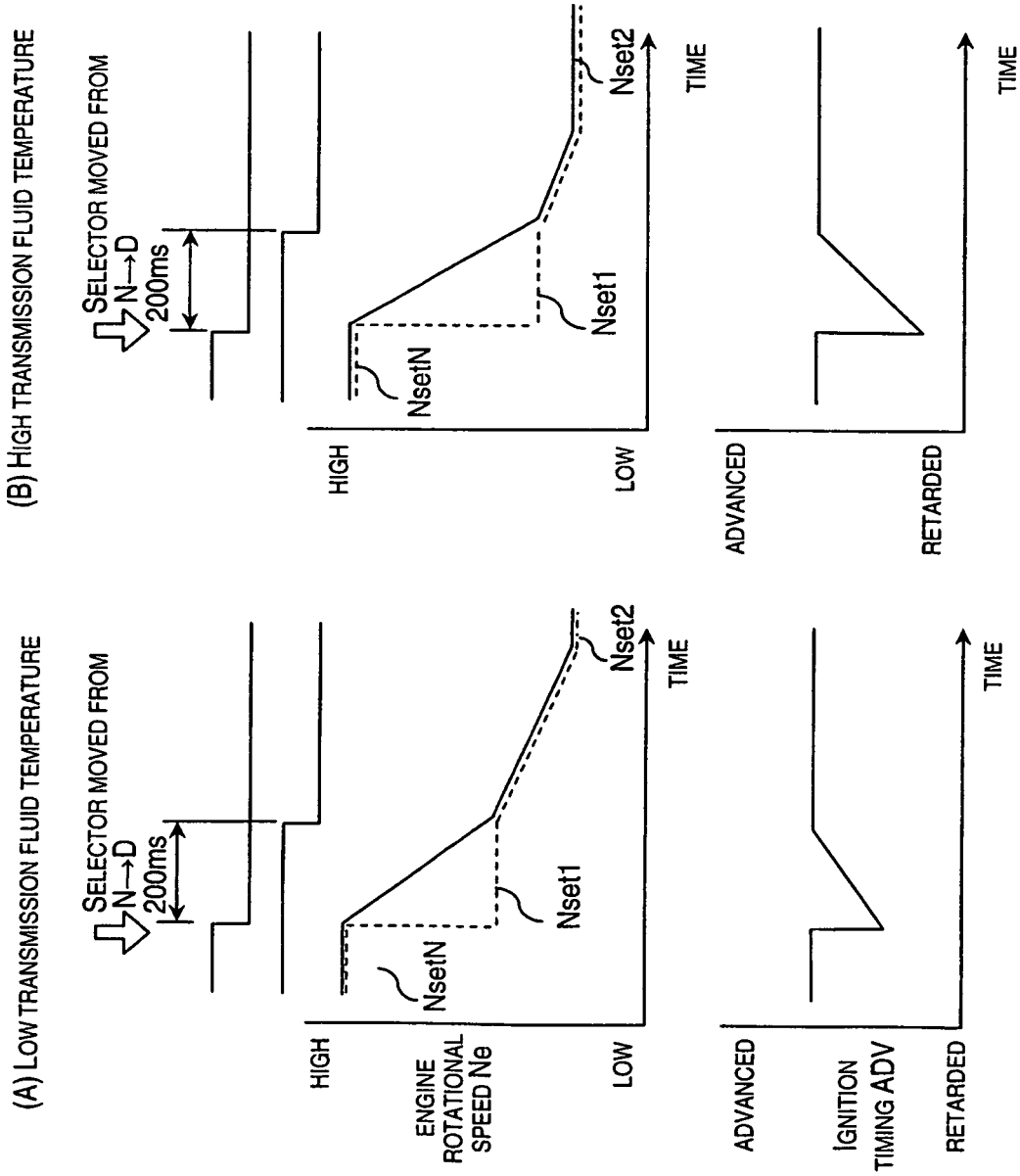
FIG. 9 are time charts showing the relationship between the engine rotational speed executed after the engine is started relative to low and high transmission fluid temperatures in accordance with the second embodiment of the present invention.

Referring now to FIGS. 8 and 9, an engine idle speed control device or system in accordance with a second embodiment of the present invention will now be discussed. The schematic structural diagrams illustrated in FIGS. 1 and 2, the table of FIG. 3, the maps of FIG. 6 and the timing charts of FIG. 7 are utilized to understand the engine idle speed control device of the second embodiment of the present invention. Basically, the engine idle speed control device of the second embodiment of the present invention is identical to the first embodiment, except that the control routine of FIG. 4 has been modified to the control routine of FIG. 8. In view of the similarity between the first and second embodiments, the parts or steps of the second embodiment that are identical to the parts or steps of the first embodiment will be given the same reference numerals as the parts of the first embodiment. Moreover, the descriptions of the parts or steps of the second embodiment that are identical to the parts or steps of the first embodiment have been omitted for the sake of brevity. In other words, unless otherwise specified, the rest of the configuration of the engine idle speed control device of the second embodiment is the same as the configuration of the first embodiment.

Basically, the first traveling target idle speed Nset1 is varied based on the detected the transmission fluid temperature Toil of the automatic transmission or engine oil.

Steps S1 to S3 of the control routine of FIG. 8 are the same as discussed above in the control routine of FIG. 4.

In step S3.1, the engine control unit 20 detects the transmission fluid temperature Toil of the automatic transmission.

In step S3.2, the engine control unit 20 sets the first traveling target idle speed Nset1 for the D range in accordance with the transmission fluid temperature Toil. The first traveling target idle speed Nset1 for the D range is set to a lower value than the target idle speed NsetN for the N range, i.e., to a value (e.g., 800 to 1000 rpm) at which an abrupt torque change will not occur due to the decline in rotational speed with respect to the target idle speed NsetN for the N range and clutch engagement shock will not occur (i.e., the level of clutch engagement shock is tolerable). A table or the like is used to set the first traveling target idle speed Nset1 in accordance with the transmission fluid temperature Toil in such a fashion that the first traveling target idle speed Nset1 is set higher when the temperature Toil is low and lower when the temperature Toil is high. This variable setting of the first traveling target idle speed Nset1 can be contrived such that the first traveling target idle speed Nset1 varies continuously in accordance with the transmission fluid temperature Toil or is set in stages (e.g., two stages: high and low) based on the transmission fluid temperature Toil.

When the temperature Toil of the transmission fluid of the automatic transmission is low, the first traveling target idle speed Nset1 is set to a comparatively high rotational speed, as shown in the timing chart (A) of FIG. 9. When the temperature Toil is low, the viscosity of the oil is high and the shift lag is longer. By setting the first traveling target idle speed Nset1 to a comparatively high rotational speed, a higher engine speed is maintained, the output of the oil pump is increased, and the shift lag can be prevented from lengthening.

When the temperature Toil of the transmission fluid of the automatic transmission is high (e.g., when the engine is restarted), the first traveling target idle speed Nset1 is set to a comparatively low rotational speed, as shown in the timing chart (A) of FIG. 9. When the temperature Toil is high, the viscosity of the oil is low and the shift lag is comparatively shorter. Under these conditions, since it is unlikely that a lower engine speed will cause the shift lag to become long, the first traveling target idle speed Nset1 can be set to a comparatively low value in order to further reduce the shift shock.

With this embodiment, the first traveling target idle speed Nset1 is set in such a manner that the lower the temperature Toil of the transmission fluid becomes, the higher the value to which the first traveling target idle speed Nset1 is set. As a result, the shift lag can be prevented from becoming long while also reducing the shift shock.

With the present invention, the engine speed is aggressively reduced by feedback controlling the ignition timing starting at the point in time when it is detected that the shift selector has been shifted from N to D. As a result, the engine speed can be ramped down to a first traveling target idle speed Nset1 at which the amount of shift shock is tolerable within the prescribed period and shift shock can be avoided even when the target idle speed NsetN for the N range is high. Meanwhile, since the target idle speed NsetN for the N range can be raised, the temperature of the exhaust gas can be raised and the catalytic converter 15 can be activated earlier to improve the exhaust performance.

Steps S4 to S15 of the control routine of FIG. 8 are the same as discussed above in the control routine of FIG. 4.

As used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine idle speed control device comprising:
   a first target idle speed setting section configured to change a target idle speed from a non-traveling target idle speed to a first traveling target idle speed that is lower than the non-traveling target idle speed upon detecting an automatic transmission being shifted from a non-traveling range to a traveling range;
   a second idle speed setting section configured to change the first traveling target idle speed to a second traveling target idle speed that is lower than the first traveling target idle speed upon detecting a prescribed period has elapsed since detecting that the automatic transmission was shifted;
   a friction detecting section configured to detect a parameter indicative of at least one of engine friction and automatic transmission friction; and
   an ignition timing retardation section configured to selectively set a revision amount of an ignition timing to revise the ignition timing to a more retarded ignition timing based on the parameter upon the target idle speed being changed from the non-traveling target idle speed to the first traveling target idle speed, with the revision amount being set such that as the friction becomes less, the ignition timing is set to be more retarded.

2. The engine idle speed control device recited in claim 1, further comprising
   a feedback controlling section configured to control the ignition timing using feedback control based on a difference between an actual engine rotational speed and the target idle speed such that the actual engine rotational speed approaches the target idle speed; and
   the ignition timing retardation section is configured such that when the target idle speed has been set to the first target idle speed, the ignition timing retardation section increases a feedback gain used for feedback control of the ignition timing to a larger gain than is used at other times, the size of the larger gain being set such that the larger gain varies in accordance with the parameter.

3. The engine idle speed control device recited in claim 1, wherein
   the friction detecting section is configured to detect at least one of an engine coolant temperature, an engine oil temperature and a transmission fluid temperature as the parameter that is indicative of at least one of the engine friction and the automatic transmission friction.

4. The engine idle speed control device recited in claim 1, further comprising
   a retardation limiting section further configured to set a retardation limit ignition timing to limit retardation of the ignition timing when the ignition timing is being retarded.

5. The engine idle speed control device recited in claim 1, further comprising
   a third idle speed setting section configured to change the first traveling target idle speed to the second traveling target idle speed when the actual engine rotational speed falls below the first traveling target idle speed during the prescribed period, even if the prescribed period has not elapsed.

6. The engine idle speed control device as recited in claim 1, wherein
   the second idle speed setting section is further configured to gradually decrease the target idle speed from the first traveling target idle speed to the second traveling target idle speed over time until reaching the second traveling target idle speed.

7. The engine idle speed control device as recited in claim 1, further comprising
   an automatic transmission temperature detecting section configured to detect a temperature of transmission fluid of the automatic transmission; and a first traveling target idle speed varying section configured to vary a setting value of the first traveling target idle speed based on the temperature of the transmission fluid that was detected.

8. The engine idle speed control device recited in claim 7, wherein
the first traveling target idle speed varying section is further configured to increase the setting value of the first traveling target idle speed as the temperature of the transmission fluid decreases.

9. The engine idle speed control device recited in claim 2, wherein
the friction detecting section is configured to detect at least one of an engine coolant temperature, an engine oil temperature and a transmission fluid temperature as the parameter that is indicative of at least one of the engine friction and the automatic transmission friction.

10. The engine idle speed control device recited in claims 9, further comprising
a retardation limiting section further configured to set a retardation limit ignition timing to limit retardation of the ignition timing when the ignition timing is being retarded.

11. The engine idle speed control device recited in claim 9, further comprising
a third idle speed setting section configured to change the first traveling target idle speed to the second traveling target idle speed when the actual engine rotational speed falls below the first traveling target idle speed during the prescribed period, even if the prescribed period has not elapsed.

12. The engine idle speed control device as recited in claim 9, wherein
the second idle speed setting section is further configured to gradually decrease the target idle speed from the first traveling target idle speed to the second traveling target idle speed over time until reaching the second traveling target idle speed.

13. The engine idle speed control device as recited in claim 9, further comprising
an automatic transmission temperature detecting section configured to detect a temperature of transmission fluid of the automatic transmission; and
a first traveling target idle speed varying section configured to vary a setting value of the first traveling target idle speed based on the temperature of the transmission fluid that was detected.

14. The engine idle speed control device recited in claim 13, wherein
the first traveling target idle speed varying section is further configured to increase the setting value of the first traveling target idle speed as the temperature of the transmission fluid decreases.

15. An engine idle speed control device comprising:

first target idle speed setting means for changing a target idle speed from a non-traveling target idle speed to a first traveling target idle speed that is lower than the non-traveling target idle speed upon detecting an automatic transmission being shifted from a non-traveling range to a traveling range;

second idle speed setting means for changing the first traveling target idle speed to a second traveling target idle speed that is lower than the first traveling target idle speed upon detecting a prescribed period has elapsed since detecting that the automatic transmission was shifted;

friction detecting means for detecting a parameter indicative of at least one of engine friction and automatic transmission friction; and ignition timing retardation means for selectively setting a revision amount of an ignition timing to revise the ignition timing to a more retarded ignition timing based on the parameter upon the target idle speed being changed from the non-traveling target idle speed to the first traveling target idle speed, with the revision amount being set such that as the friction becomes less, the ignition timing is set to be more retarded.

16. A method of controlling an engine comprising:

changing a target idle speed from a non-traveling target idle speed to a first traveling target idle speed that is lower than the non-traveling target idle speed upon detecting an automatic transmission being shifted from a non-traveling range to a traveling range;

changing the first traveling target idle speed to a second traveling target idle speed that is lower than the first traveling target idle speed upon detecting a prescribed period has elapsed since detecting that the automatic transmission was shifted;

detecting a parameter indicative of at least one of engine friction and automatic transmission friction; and selectively setting a revision amount of an ignition timing to revise the ignition timing to a more retarded ignition timing based on the parameter upon the target idle speed being changed from the non-traveling target idle speed to the first traveling target idle speed, with the revision amount being set such that as the friction becomes less, the ignition timing is set to be more retarded.

* * * * *